United States Patent [19]

Hattori et al.

[11] Patent Number: 4,633,908
[45] Date of Patent: Jan. 6, 1987

[54] MANUALLY OPERATED MODE-SELECTING VALVE DEVICE

[75] Inventors: Masaichi Hattori; Akira Hanaki; Kouichi Kihira, all of Aichi, Japan

[73] Assignee: Kabushiki-Kaisha Tokai Rika Denki Seisakusho, Japan

[21] Appl. No.: 528,806

[22] Filed: Sep. 2, 1983

[30] Foreign Application Priority Data

Sep. 16, 1982 [JP] Japan .................. 57-140348[U]

[51] Int. Cl.⁴ ............... F16K 11/065; F16K 31/44
[52] U.S. Cl. ...................... 137/637.1; 98/2.08; 137/353; 137/625.25; 165/24; 237/12.3 A; 237/12.3 R
[58] Field of Search ............. 137/637.1, 596, 353, 137/625.25, 884; 237/12.3 A; 165/24, 42, 43, 17; 62/161; 98/2.08

[56] References Cited

U.S. PATENT DOCUMENTS

| | | |
|---|---|---|
| 2,914,629 | 11/1959 | D'Aprile et al. ............... 137/637.1 |
| 2,966,032 | 12/1960 | Weymouth, Jr. ............... 137/637.1 |
| 2,966,081 | 8/1961 | Wise .............................. 137/637.1 |
| 3,353,452 | 11/1967 | Beck et al. .................. 137/625.25 |
| 4,126,153 | 11/1978 | Raab .............................. 137/353 |
| 4,212,322 | 7/1980 | Douglas et al. ............... 137/884 |
| 4,291,725 | 9/1981 | Raab et al. ................... 137/625.25 |
| 4,448,390 | 5/1984 | Halstead et al. ............. 137/353 |
| 4,509,553 | 4/1985 | Hahn ......................... 137/625.25 |

Primary Examiner—George L. Walton
Attorney, Agent, or Firm—Steele, Gould & Fried

[57] ABSTRACT

A manually operated mode-selecting valve device allowing pressurized air to be transmitted to a plurality of working agents so as to actuate them simultaneously with the movement of a single valve medium upon operating a corresponding single actuator is disclosed. The operational force required is reduced to such a point as that merely needed to move a single number of the valve medium. The valve medium serves as an air-passage way in cooperation with an air-passage forming medium, thereby rendering reducing the number of part components together with structural simplification.

3 Claims, 7 Drawing Figures

| | S | 34 | 35 | 36 |
|---|---|---|---|---|
| 4 | O—|—O—|—O—|—O |
| 5 | O—|—O—|—O | |
| 6 | O | | | |
| 7 | O—|———|—O | |
| 8 | O—|———|—O—|—O |

|   | S | a | b | c | d |
|---|---|---|---|---|---|
| A | O─|─O─|─O─|─O |   |
| B | O─|─O─|─O─|─O─|─O |
| C | O─|─O─|─O─|─O─|─O |
| D | O─|───|───|───|─O |
| E | O─|───|─O─|─O─|─O |

MANUALLY OPERATED MODE-SELECTING VALVE DEVICE

BACKGROUND OF THE INVENTION (1) Field of the Art

This invention relates to a manually operated mode-selecting valve device which simultaneously activates desired numbers of working agents with movement of valve medium upon operating a single actuator means selected from a plurality of ones.

(2) Description of the Prior Art

In an air-conditioner for motor vehicle, for example, a manually operated mode-selecting valve is equipped within the interior of the compartment as an air-flow changer system so as to selectively open upper, lower and defrost air-vents at a suitable degree of combination.

The mode-selecting valve thus introduced comprises valve media, a plurality of actuator rods corresponding to the valve media, and damper-plates for opening the preceding air-vents, so that it is possible to open desired air-vent or vents simultaneously by moving corresponding valve medium or media with operation of a single actuator rod.

Thus allowing for a suitable mode-selection, however, some mode-selection occasions to move more than a single number of valve medium at once, and thus requires larger quantity of operational force upon actuation.

SUMMARY OF THE INVENTION

It is therefore a primary object of the present invention to provide a novel manually operated mode-selecting valve device which will be particularly effective in eliminating the above disadvantage of the prior art device.

It is an object of the invention to provide an improved manually operated mode-selecting valve device which is capable of actuating a plurality of working agents by a single actuator means with minimum operational force.

According to the present invention, there is provided a mode-selecting valve device which allows pressurized air to transmit to a plurality of working agents so as to actuate them simultaneously at a suitable degree of combination with the movement of a single valve medium upon operating a corresponding actuator means, whereby the operational force reduces to such a point as only needed to move a single number of the valve medium.

Further, the valve medium serves as an air-passage way in cooperation with an air-passage forming medium so as to reduce the number of part components coupled with simplified construction.

The above and other objects, features and advantages of the present invention will become apparent from the following description and the appended claims, taken in conjunction with the accompanying drawings which shows by way of example preferred embodiments of the present invention and in which like component parts are designated by like reference numerals throughout the various figures.

BRIEF DESCRIPTION OF DRAWINGS

In the accompanying drawings.

DETAILED DESCRIPTION OF PREFERRED EMBODIMENTS

Figure 1:
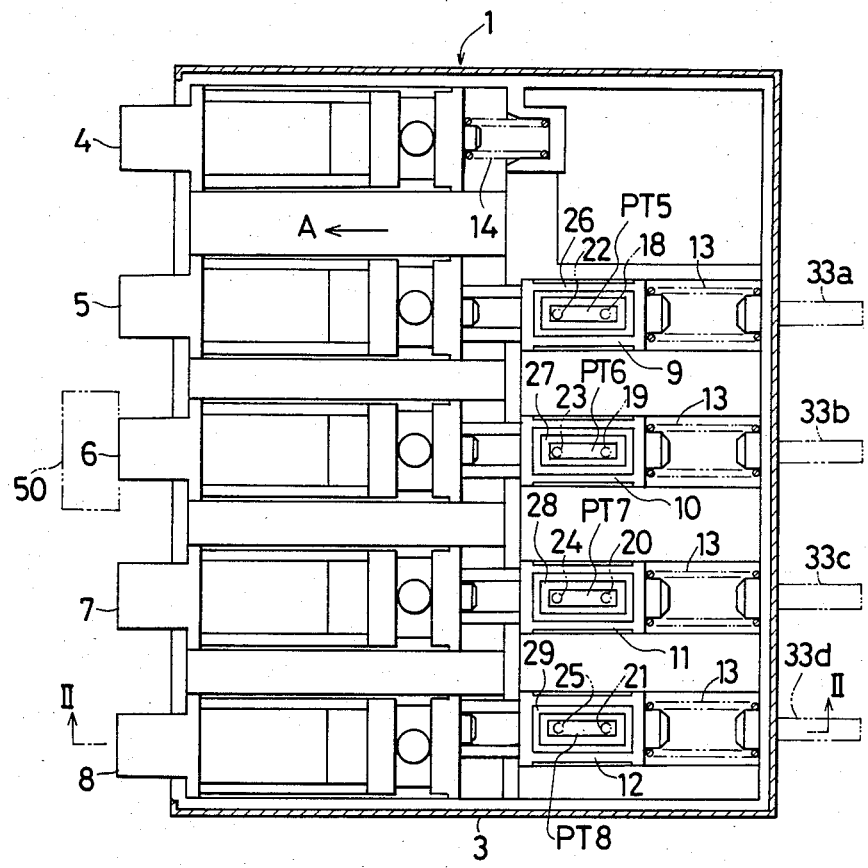
FIG. 1 is a plan view showing a valve device with the upper base plate removed.
Figure 2:
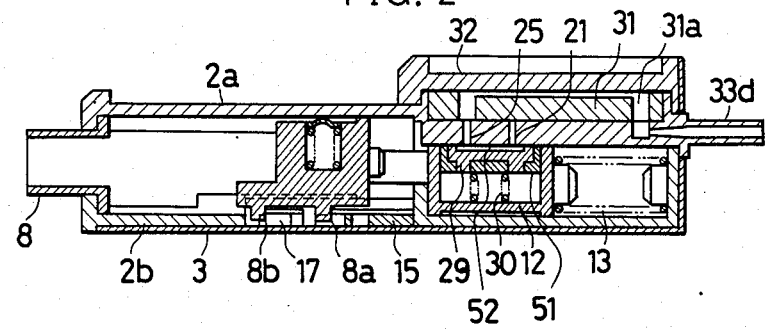
FIG. 2 is a longitudinal cross sectional view along the line II—II of FIG. 1.

Referring to FIGS. 1 through 5, there is shown a mode-selecting valve device according to one embodiment of the invention. Numeral 1 designates a flat-shaped housing comprising a casing 3 with its upper and front sides open, and vertically opposed upper and lower base plates 2a, 2b each enclosed into the casing 3. Between the upper and lower base plates 2a, 2b are elongated actuator rods 4 through 8 slidably disposed which are in parallel alignment to each other, so that each of the actuator rods moves in the directions of arrow A and opposite to arrow A. The actuator rods individually have one end projecting from the front open side of the casing 3 to have a button 50 (shown only one), while other end position (except that of the rod 4) within the casing 3 to have a valve plate holders 9 through 12. Between each of the valve plate holders and the side wall positioned opposite to the front open side of the casing 3, is secured a compression coil spring 13 secured which acts as a spring means, in order to bias each of the actuator rods toward its original position, the manner of which is as seen in FIG. 2. Between the actuator rod 4 and the central portion of the casing 3 is secured another compression coil spring 14 in the similar manner to the spring 13 mentioned above. With each bottom of the actuator rods 4 through 8, is a pair of axially spaced lugs provided which are in turn indicated as 4a and 4b, 5a and 5b, 6a and 6b, 7a and 7b, 8a and 8b. Across the actuator rods 4 through 8 is an elongated locker plate 15 slidably mounted, so that the plate 15 moves in the direction perpendicular to each of the actuator rods. The locker plate 15 has projection 15A at its lengthwise side at regular intervals to respectively correspond to the actuator rods. The projections 15A individually have delta-shaped pawls 15a through 15e with their slanted portions in contact with the lugs 4a through 8a. In this condition, the locker plate 15 is always biased by a compression spring 16 to bring the pawl into abuttment with a lug as indicated by arrow B in FIG. 3.

Figure 3:
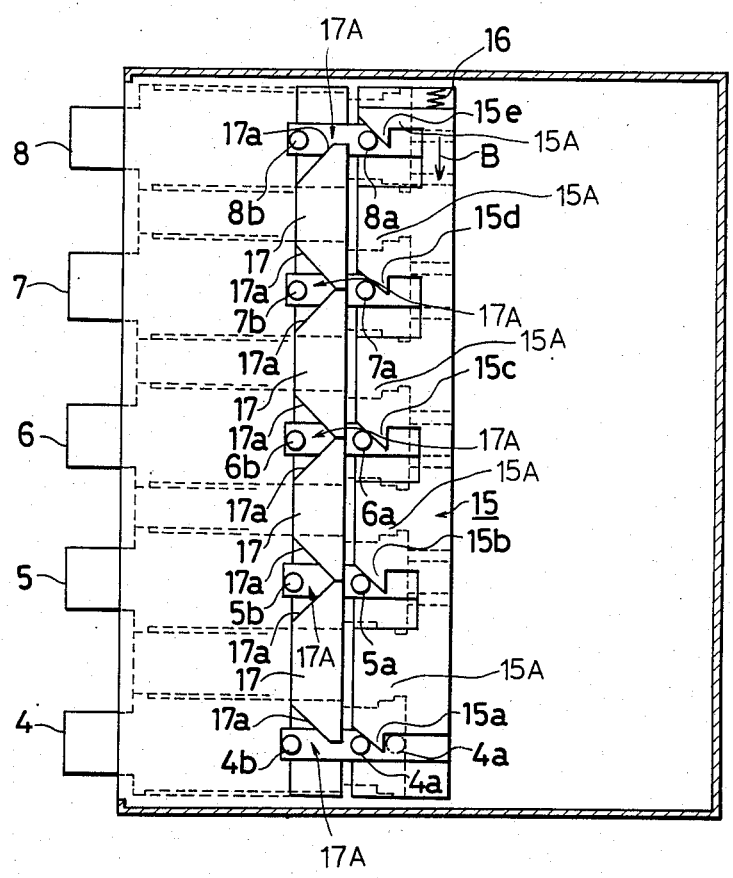
FIG. 3 is a bottom view of the valve device with the lower base plate removed.

A row of trapezoid-shaped regulation plates 17 are disposed in parallel relationship with the locker plate 15 so as to each locate between the neighboring actuator rods. The regulation plates are adapted to individually move along the lengthwise side of the locker plate 15, and the same plates have their neighboring ends located between the paired lugs to butt against each other so as to form a V-shaped closure with their neighboring slanted sides 17a and 17a as seen in FIG. 3. In this instance, the lugs 4b through 8b position to oppose to the slanted side 17a of each regulation plate 17 to constitute a cross-operation preventive means 17A in cooperation with the regulation plates 17 with a view to stopping a plurality of the actuator rods from being simultaneously operated as readily understood hereinafter.

Referring again to FIG. 1, the upper base plate 2a provides its thickness-oriented through-holes to form a lengthwise aligned series of inlet parts paired with work ports indicated in turn as 18 and 22, 19 and 23, 20 and 24, 21 and 25 each corresponding the valve plate holders 9 through 12. Accordingly, the upper base plate 2a serves as a port forming medium.

The inlet ports thus paired with the work ports constitute four pairs of ports PT5 through PT8 temporarily termed for convenience, which individually correspond to the actuator rods 5 through 8.

Located beneath the upper base plate 2a are valve plates 26 through 29 which are made from rubber material, and individually received at the holders 9 through 12 via support seats 51. The valve plates thus arranged individually have a recess 52 at each of the upper surfaces which in turn correspond to the pairs of ports PT5 through PT8 as seen in FIG. 1, and are always biased by a compression spring 30, so that the recess 52 has its outer periphery air-tightly abut against the lower surface of the upper base plate 2a, allowing it to slide therealong. The recess 52 provides its inner surface with such dimension that it hermetically covers both the inlet and work ports when the actuator rod occupies the original position as seen in FIG. 2, while covering the inlet port alone when the actuator rod is pushed against the force of the spring 13 to move in the direction opposite to arrow A so as to occupy an operative position.

The arrangement between the paired ports is such that when the actuator rods 5 through 8 individually occupy the original position, the inlet port 18 is in communication with the work port 22 through the recess 52 of the valve plate 26, the inlet ports 19, 20 and 21 similarly in turn being in communication with the work ports 23, 24 and 25. Upon moving the actuator rod 8, for example, to occupy the operative position, the valve plate 29 concurrently moves to release the work port 25 from the coverage by the inner surface of the recess 52 so as to expose it to the atmosphere, while maintaining the coverage over the inlet port 21.

Figures 4, 5:
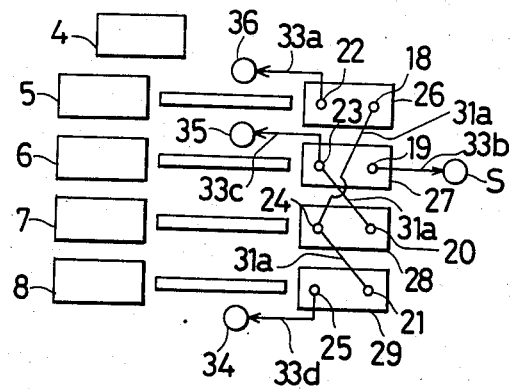
FIG. 4 is a schematic diagram showing relationship between actuator means and working agents which is selectively actuated by the actuator means.
FIG. 5 is an illustration showing an air-passage way net work for pressurized air.

Calling attention again to FIG. 2, on the upper base plate 2a is an air-passage forming medium 31 placed across the actuator rods 5 through 8 to substantially locate above the paired ports PT5 through PT8. The medium 31, made from plate-shaped rubber, is arranged to be sandwiched between the upper base plate 2a and a coverage panel 32 attached to the upper surface of the base plate 2a. In this instance, the medium 31 has grooves at its upper surface, the upper open periphery of which is air-tightly sealed by the coverage panel 32 to constitute an air-passage way 31a as seen in FIG. 5.

With the upper base plate 2a are provided tube connectors 33a through 33d which in turn correspond to the actuator rods 5 through 8 to form a tube connector system 33. The connector 33b is at one end communicated with a vacuum source (S) via a suitable pasage (not shown), while each end of other connectors 33d, 33c and 33a being in turn connected with working agents such as diaphragm-bearing accumulators 34, 35 and 36 as seen in FIG. 5. The accumulators are of well-known type for those versed in the art wherein pressurized air exerting on a diaphragm induces it to move so as to directly transmit its movement to a suitable actuator.

The air-passage way 31a which is provided with the medium 31 comprises as follows:

That is, a first passage way communicating between the tube connector 33b and the inlet port 19 of the paired port PT6; second passage ways comunicating with the work ports 22, 23, 25 with the tube connectors 33a, 33c, 33d respectively; and third passage ways comunicating both the inlet ports 18, 21 with the work port 24 while the inlet port 20 being with the work port 23.

OPERATION

Upon manually pushing the actuator rod 4 against the force of the spring 14 to move it in the direction opposite to arrow A, for example, the lug 4a is displaced and urged into engagement with the pawl 15a along its slant side to lock the rod 4 at the operative position as seen in broken lines in FIG. 3. With the engagement of the lug 4a with the pawl 15a, the locker plate 15 temporarily moves against the force of the spring 16 to move away from the lug in the direction opposite to arrow B.

In consequence, for those instances where any one of the actuator rods other than that of the above had occupied the operative position previously, the rod moves back by the force of its associated compression spring 13 from the operative position to the original position for the reason that the lug is brought out of engagement with the pawl to thus liberate the corresponding rod.

It is apparent that the same can be said with the operation of the actuator rods 5 through 8 instead of the rod 4 alone.

In addition, for those instances where more than a single actuator rod is simultaneously operated to move in the direction opposite to arrow A, the lugs which in turn correspond to said rods displace to respectively encounter a single or paired slant side 17a of the regulation plate or plates 17 to push thereagainst, so that the regulation plates are individually impeded in their movement to prohibit the passage of the lugs so as to prevent cross-operation.

Now, FIG. 4 is a diagram showing the relationship between an actuator rod and the accumulator actuated by the rod, in which when a circle (o) is indicated the case that the accumulator is communicated with the vacuum source (S), while a blank signifies that the accumulator is communicated with the atmosphere. According to FIG. 4, operating the actuator rod 4 communicates all the accumulators 34, 35 and 36 with the vacuum source (S), operating the rod 5 communicates the accumulators 34 and 35 with the source (S) while the accumulator 36 communicates with the atmosphere, operating the rod 6 communicates all the accumulators 34, 35 and 36 with the atmosphere. Operating the rod 7 communicates the accumulator 35 with the vacuum source (S) while the other accumulators 34 and 36 are communicated with the atmosphere. Operating the rod 8 communicates the accumulators 35 and 36 with the vacuum source (S) while the other accumulator 34 communicates with the atmosphere.

The mode-selecting device thus far described is preferably incorporated in a damper-actuator with a view to changing the air-flow path of an air-conditioner for motor vehicles.

In the application, the actuator rod 4 corresponds to selecting the upper air-vent, the rod 5 corresponds to both upper and lower air-vents, the rod 6 corresponds to the lower air-vent, the rod 7 corresponds to both the lower air-vent and defrost air-vent for front view window glass, while the rod 8 corresponds to the defrost air-vent exclusively.

On the other hand, the diaphragm-bearing accumulator 34 is adapted to actuate a first damper so as to selectively change the direction of air-flow path against the defrost air-vent and the upper air-vent. The other accumulators 35 and 36 are adapted to alternatively actuate a second damper into three different positions, so the second damper opens the lower air-vent at the first position while opening both the upper and lower air-vents at the second position, and opening both the lower and defrost air-vents at the third position.

As is apparent from the foregoing description, the invention allows the device to actuate a single valve plate with a single actuator rod to communicate a single or plural numbers of working agents with vacuum source or the atmosphere at a suitable degree of combination, and thus allows for minimum quantity of operational force upon actuation.

Furthermore, it is appreciated that air-passage way, which is a means to selectively actuate a plurality of working agents with the movement of a single valve plate, is constructed not only by the air-passage forming medium 31 but cooperation of other valve plates therewith. This is conducive to reduction of the number of part components together with structural simplification.

Further, the ports 18 through 25 are provided through the upper base plate 2a while the valve plates are slidably mounted on the base plate 2a with the recesses corresponding to the ports, thus readily allowing the ports to communicate with each other or communicate one with the atmosphere while air-tightly sealing others with significantly simplified construction.

On top of that, the air-passage forming medium 31 is sandwiched between the upper base plate 2a and the coverage panel 32, thus making it possible to reduce the vertical thickness. This is conducive to space-saving, particularly upon installation.

Figures 6, 7:
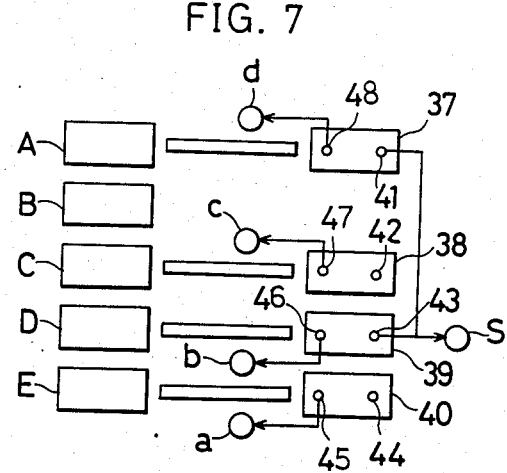
FIG. 6 is a view similar to FIG. 4 according to a modified form of the invention.
FIG. 7 is a view similar to FIG. 5 according to said modified form of the invention.

FIGS. 6 and 7 show a modification form according to the invention in which there are provided actuator rods A through E and diaphragm-bearing accumulators a through d. FIG. 6 is similar to FIG. 4 in which a circle (o) indicates that an accumulator is in communication with the vacuum source while a blank signifies that the accumulator is in communication with the atmosphere.

Valve plates 37 through 40 in turn correspond to the actuator rods A, C, D and E, so that only a single rod is allowed to occupy the operative position so as to prevent cross-operation as mentioned in the preceding embodiment. Each of the valve plates 37 through 40 has an inlet port paired with a work port in turn indicated as 41 and 48, 42 and 47, 43 and 46, 44 and 45.

In this instance, the inlet ports 41 and 43 are both in communication with the vacuum source (S) while the other inlet ports 42 and 44 both being with the work port 46. The accumulators a through d are in turn communicated with the work ports 45 through 48.

With this structure, the same effects identical to those mentioned in the preceding embodiment are obtained.

Note that compressed air pressure may be employed instead of the vacuum source, while an air-cylinder may be employed in place of the diaphragm-bearing accumulator.

While the form of the invention now preferred has been disclosed as required by statute, other forms may be used, all coming within the scope of the claimed subjected matter which follows:

What is claimed is:

1. A manually operated mode-selecting valve device of the type wherein a single or plurality of working agents are actuated upon operation of a single actuator means in accordance with a predetermined mode selection, comprising:
    (a) a port forming medium having a plurality of paired ports (PT5-PT8) each arranged with an inlet port (18) and a work port (22) as one pair;
    (b) valve media (26-29) mounted on said port forming medium with their respective locations corresponding to those of the paired ports (PT5-PT8), the valve media being adapted to individually move between an original position where said inlet and work ports are communicated at a suitable degree of combination and an operative position where selected numbers of said work ports are in communication with the atmosphere and other selected numbers of said inlet ports are air-tightly sealed;
    (c) spring means (13) which individually bias said valve media (26-29) toward their said original positions;
    (d) actuator means (5-8) adapted to be manually operated to individually push said valve media to move them from their said original positions to said operative positions and to hold them at the operative positions;
    (e) a cross-operation preventive means (17) which prohibits more than a single one of said actuator means (5-8) from being simultaneously operated;
    (f) a tube connector system (33b) always communicating between a pressurized source and the inlet port (19) of one of the paired ports (PT6) suitably selected so that the number of working agents to be operated may be minimized; and
    (g) an air-passage forming medium (31) having air-passage ways (31a) thereon, said air-passage ways communicating between the work port (23) of one of said selected paired ports (PT6) and the inlet port (20) of another of the paired ports (PT7), the valve medium (28) of which is operated with one of said actuator means (7) so that the number of working agents to be selected may be minimized next to that selected with another of the actuator means (6).

2. A manually operated mode-selecting valve device as set forth in claim 1, wherein the port forming medium is plate-shaped and is provided with holes for said paired ports (PT5-PT8) and wherein said valve media (26-29) are air-tightly mounted for slidable motion at one side of the port forming medium, each of said valve media (26-29) having at the sliding side a recess (52) which is adapted to cover the holes of both inlet and work ports of a pair when each of said actuator means (5-8) occupies the original position, and is adapted to move to expose the work port to the atmosphere while maintaining the coverage over the inlet port when each of the actuator means (5-8) occupies the operative position.

3. A manually operated mode-selecting valve device as set forth in claim 2, wherein the air-passage forming medium (31) is plate-shaped with a groove for air-passage ways thereon and which is sandwiched between the other side of the port forming medium and a coverage panel (32) so that the open periphery of said groove is air-tightly closed to form the air-passage ways.

* * * * *